April 21, 1970  JAMES E. WEBB  3,508,156
ADMINISTRATOR OF THE NATIONAL AERONAUTICS
AND SPACE ADMINISTRATION
REFLECTOMETER FOR RECEIVER INPUT IMPEDANCE MATCH MEASUREMENT
Filed June 27, 1967
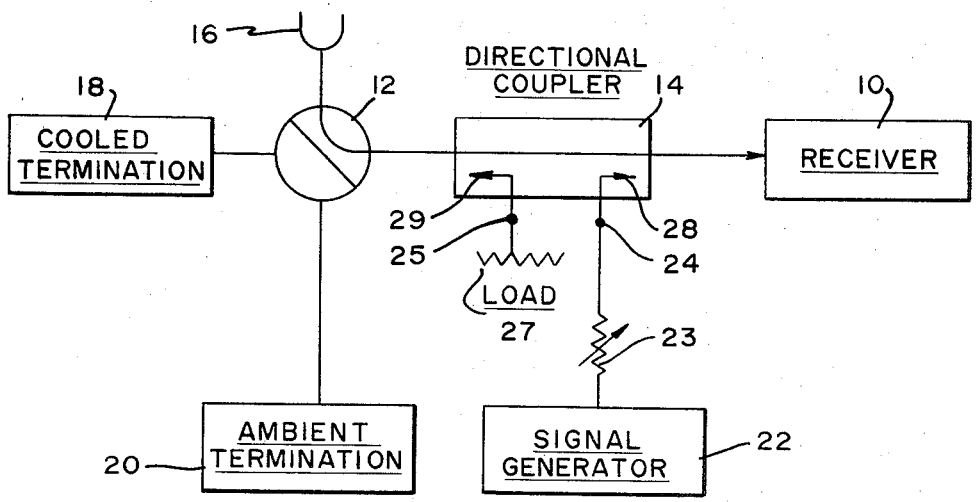
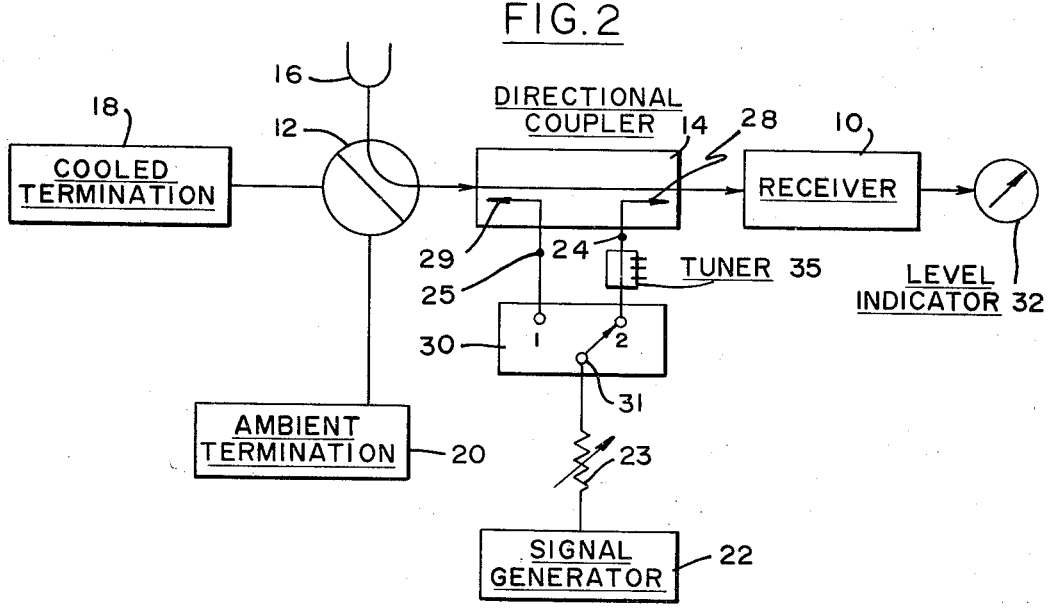
INVENTOR.
CHARLES T. STELZRIED
ATTORNEY United States Patent Office 3,508,156
Patented Apr. 21, 1970

3,508,156
REFLECTOMETER FOR RECEIVER INPUT IMPEDANCE MATCH MEASUREMENT
James E. Webb, Administrator of the National Aeronautics and Space Administration, with respect to an invention of Charles T. Stelzried, La Crescenta, Calif.
Filed June 27, 1967, Ser. No. 649,358
Int. Cl. H04b 1/18
U.S. Cl. 325—363         8 Claims

ABSTRACT OF THE DISCLOSURE

A receiver input system in which a receiver is coupled to an antenna or other terminations through a directional coupler, used in the prior art to inject signals from a separate source into the receiver for receiver gain measurements. In the present invention, a two position switch is provided between the source and the directional coupler. The switch directs the signal toward or away from the receiver. When the signal is directed away from the receiver, some will be reflected back into the receiver due to any impedance mismatch. The difference in its output when signals are either reflected thereto or incidentally received thereby is a measure of impedance mismatch.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to a microwave receiver input system and, more particularly, to a low noise receiver input system with a reflectometer an integral part thereof.

Description of the prior art

The problems of impedance matching in microwave energy or signal transmission systems are well known. The requirement for impedance matching is particularly present in microwave transmission systems which are to operate with very low noise levels. For example, in a space communication receiver input system, in which extremely low level signals are received from the tracking antenna, impedance matching is of primary importance in order to minimize reflected energy waves which contribute to system noise. This is especially important if precise signal level measurements are to be performed.

Herebefore impedance matching measurements could only be performed by first physically disconnecting elements of the input system and thereafter individually connecting them to a reflectometer. Such a technique, though useful, is quite disadvantageous since it involves disconnecting the receiver input system which is time consuming. Also such an operation greatly increases the cost of receiver maintenance. Because of these factors herebefore, impedance matching measurements were not included in routine receiver calibration which are periodically performed to check out the receiver's performance. A need therefore exists for a receiver input system in which impedance matching measurements could be performed without encountering the prior art problems.

OBJECTS AND SUMMARY OF THE INVENTION

It is a primary object of the present invention to provide an improved receiver input system in which impedance matching measurements can be performed without encountering the disadvantageous characteristic of prior art techniques.

Another object of the invention is to provide a receiver input system which integrally incorporates means with which the reflectance coefficient of elements of the system are easily measured without having to disconnect the input system.

Still another object of this invention is to provide a receiver input system in which impedance matching measurements are performable without element disconnecting, thereby greatly reducing the cost of system maintenance.

Still a further object is to provide a new method for measuring the reflectance coefficients of elements in a receiver input system without resort to a separate reflectometer.

These and other objects of the invention are achieved by providing, in an otherwise conventional receiver input system, a few additional elements which, together with other elements in the conventional receiver input system, provide reflectance coefficient measuring capabilities as an integral characteristic of the system. These measurements are performed without having to disconnect the system and connecting each of its elements to a separate reflectometer. Since the invention finds particular utility in a low noise space communication type receiver input system, it will be described in conjunction therewith. However, it should be appreciated that the invention is not limited thereto and could be practiced in any microwave transmission system in which impedance matching or reflectance coefficient measurements are desired.

Briefly, in a known prior art space communication receiver input system, a tracking antenna is coupled through a waveguide switch and the main line of a directional coupler to the receiver. Because of the extremely low levels of the received signals, the receiver includes high gain maser preamplifier and amplifiers. Hereafter, sometimes reference will be made to the amplifier or maser input, which is the receiver input. The directional coupler is included so that selectively attenuated calibration signals from a signal generator may be injected at the amplifier or maser input, without having to disconnect any waveguide sections leading to the antenna or other termination devices to which the maser is couplable through the waveguide switch. Generally, the signal generator is connected to a first port of the auxiliary line of the coupler through an attenuator, while the other or second port of this line is terminated by a termination.

Briefly, in accordance with this invention, the first and second ports of the auxiliary line of the directional coupler are connected to a coaxial or waveguide switch. This switch is used to selectively connect either port to the source of signals through the attenuator. A level indicator is connected to the receiver output. By first injecting signals from the source through the second port of the auxiliary line, the signals are directed to one of the termination devices, such as the antenna. The major portion of the signal power is dissipated in the termination device. Due to imperfect impedance matching a small portion of the signal is reflected to the receiver, whose output is observed on the level indicator. Thereafter, the signal from the source is injected through the first port of the auxiliary line, and the attenuator is adjusted until the output of the receiver, as seen on the level indicator, matches the reading produced by power reflected from the termination device being evaluated. The difference in attenuator reading is a measure of the impedance mismatch.

The novel features that are considered characteristic of this invention are set forth with particularity in the appended claims. The invention will best be understood

BRIEF DESCRIPTION OF THE DRAWINGS

FIGURE 1 is a block diagram of a prior art receiver input system; and

FIGURE 2 is a block diagram of the improved receiver system of the present invention.

DESCRIPTION OF THE PREFERRED EMBODIMENTS

Reference is now made to FIGURE 1 in which a prior art receiver input system is diagrammed and shown including a receiver 10 whose input is connected to a waveguide switch 12 through the main line of a directional coupler 14. The purpose of switch 12 is to selectively connect the receiver input to any one of a plurality of termination devices or simply terminations, one of which is a tracking antenna 16. The other terminations may include a cooled termination 18 and an ambient termination 20, which are used as standard thermal terminations for calibration purposes, when the receiver 10 includes maser preamplifiers and amplifiers, as is assumed herein.

In addition, the prior art receiver input system is shown including a signal generator 22 which, through an attenuator 23, is connected to port 24 of the auxiliary line of the directional coupler 14. The directions of signals injected into the main line from signals applied at terminals 24 and 25 are represented by arrows 28 and 29 respectively. That is, signals applied at terminal 24 are injected into the main line, directed towards the receiver 10, while if signals were applied at port 25, they would be injected into the main line towards the terminations. The arrangement consisting of generator 22, attenuator 23, and directional coupler 14, is incorporated for the purpose of injecting signals to the receiver, for receiver gain measurements and other special tests, without having to decouple the receiver from the antenna or the other termination to which it is connected under normal operation.

In the prior art, such an arrangement was used only to provide an external source of test signals which are suppliable to the receiver for gain measurements. However, in accordance with the teachings of this invention, the arrangement (generator 22, attenuator 23 and coupler 14), together with a few added elements, is used to provide an additional capability of measuring impedance mismatching without having to disconnect the various elements.

This primary aspect of the invention may best be explained in conjunction with FIGURE 2 wherein the improved receiver input system of the present invention is diagrammed. Therein, elements like those shown in FIGURE 1 are designated by like numerals. As seen in FIGURE 2, the attenuator 23 is connected to the ports or terminals 24 and 25 of the auxiliary line of directional coupler 14 through a two position switch 30. The switch 30, which may be of the waveguide or coaxial type, will hereafter for explanatory purposes only, be referred to as the coaxial switch to distinguish it from the waveguide switch 12. In position 1, signals from source 22 are injected into the coupler through port 25, while in position 2 (as diagrammed), the signals are applied to port 24 so that a part thereof is directed to receiver 10. In addition to coaxial switch 30, the system of the invention includes a level indicator 32 connected to indicate the level of the receiver output.

In operation, to measure impedance mismatch between the receiver 10 and one of its terminations, such as antenna 16, waveguide switch 12 is positioned to connect the antenna to the receiver and the coaxial switch 30 is switched to position 1. Signals from source 22 are then injected into the coupler 14. Some of the signal power is directed to the antenna 16. If the antenna 16 provides a perfect impedance match to the receiver input, all the signal power will be dissipated in the antenna. However, any impedance mismatch will result in the reflection of part of the signal power by the antenna into the receiver 10. The level of reflection indicated on level indicator 32, is regarded as a reference level. Also the attenuator setting is recorded.

Thereafter, the coaxial switch 30 is switched to position 2 injecting signals directly to the receiver 10. The setting of attenuator 23 is then adjusted until the reference level is again indicated in level indicator 32. The difference between the attenuator settings represents the difference between incident and reflected signal power at the receiver input, which represents the degree of impedance mismatch of the antenna (or any other termination), as seen by the receiver input.

From the foregoing, it should thus be appreciated that by adding the switch 30 and level indicator 32, two relatively simple and inexpensive elements, the prior art receiver input system is converted into an improved system with built-in impedance matching measurement capability. The improved system may be thought of as one with a built-in reflectometer. Furthermore, the measurement is performable without having to disconnect any of the waveguide sections. Thus, the various objects of the invention are realized. It should further be pointed out that the built-in reflectometer may be utilized as a built-in trouble shooting instrument before and after replacement of parts, such as the waveguide switch 12 or any of the waveguide sections (not shown), or the terminations, which together comprise the receiver input system.

In practice, ports 24 and 25 are coupled to the coaxial switch 30 through proper termination devices such as isolators, so that when signals from source 22 are injected through one of the ports, the other port is properly terminated. Since such devices are well known in the art, they have been purposely deleted from FIGURE 2.

For highest accuracy, the improved receiver input system of this invention may include a tuner 35 coupled to port 24, for tuning the arrangement which forms the built-in reflectometer. This is accomplished by substituting one of the terminations with a known match through the waveguide switch 12 and thereafter adjusting the tuner to minimize the reflected power which is received by the receiver 10. Such a tuning device is well known in the art.

There has accordingly been shown and described an improved receiver input system with a built-in reflectometer, with which impedance matching measurements may be performed in a few simple steps, without equipment dismantling. It is appreciated that those familiar with the art may make modifications and/or substitute equivalents in the arrangement as shown without departing from the spirit of the invention. Therefore, all such modifications and/or equivalents are deemed to fall within the scope of the invention as claimed in the appended claims.

What is claimed is:

1. In a receiver input system including a receiver, and an antenna, couplable to said receiver to apply signals thereto, the improvement comprising:
   a directional coupler through which signals from said antenna are applied to said receiver;
   a source of signals;
   switch means for successively directing a first signal supplied thereto from said source to said antenna through said directional coupler for reflection to said receiver and for directing a second signal from said source directly to said receiver through said directional coupler; and
   means for indicating the levels of said first and second signals received at said receiver, said directional coupler having first and second auxiliary line ports connected to said switch means which has first and second positions and switchable therebetween, said system including an attenuator between said source and said switch means, whereby when said switch means is in said first position, said first signal from said source through said attenuator is injected into said coupler through said first port and directed for reflection to said receiver from said antenna and in said second position the second signal is injected into said coupler through said second port and directed to said receiver, said attenuator being adjustable from a first attenuation position when said switch means is in said first position to a second attenuation position when said switch means is in said second position so that the level of said level indicator is the same when said switch means is in either position.

2. The receiver input system as recited in claim 1 further including a plurality of thermal termination means and a waveguide switch interposed between said directional coupler and the antenna and the plurality of the thermal termination means to selectively couple either said antenna or one of said thermal termination means to the receiver through said directional coupler.

3. The receiver input system as recited in claim 2 wherein said waveguide switch is further adapted to a couple a termination of known impedance to said receiver, said termination of known impedance being adapted to receive a signal from said source when said switch means is in said first position, the system further including tuning means coupled to said second port for minimizing the signal reflected to said receiver from the termination of known impedance.

4. In a receiver input system including a receiver, an antenna and a directional coupler coupling said antenna to said receiver to apply signals thereto an arrangement for further utilizing said directional coupler to measure the impedance match between said antenna and the receiver, comprising:
a source of signals;
first means for directing first signals from said source through said coupler to said antenna for reflection to said receiver;
second means for directing second signals from said source through said coupler directly to said receiver;
means for indicating the level of each of the first and second signals at said receiver; and
signal attenuating means disposed between said source and said first and second means for controlling the relative amplitudes of said first and second signals from said source so that the levels of said first and second signals at said receiver are substantially the same.

5. The receiver input system of claim 4 further including at least one receiver termination and switch means, interposed between said directional coupler and the antenna and said at least one receiver termination, for selectively coupling either the antenna or said at least one termination to said receiver, and said first means and said second means comprising first and second switch terminals in a two position switch.

6. The method of using a directional coupler connected between a receiver and at least one receiver termination in a receiver input system, to measure impedance mismatch between the receiver and said at least one termination, the steps comprising:
applying first signals through the directional coupler to said at least one termination for reflection of some of the first signals to the receiver;
applying second signals through the directional coupler directly to the receiver;
indicating the levels of the first and second signals applied at the receiver input; and
adjusting the level of the second signals applied through the directional coupler until the levels of the first and second signals at the receiver input are substantially equal.

7. In a receiver input system in which a receiver is couplable through a directional coupler to one of a plurality of terminations, selected as a function of the position of a waveguide switch, and in which an external source of signals is connectable through an adjustable attenuator to the directional coupler to selectively apply signals from said source to said receiver for measuring the gain characteristics thereof, the method of measuring impedance mismatch between said receiver and one of the terminations, the steps comprising:
providing a two position switch between the attenuator and the directional coupler;
providing a level indicator at the receiver output;
switching the switch to a first position;
injecting signals from the source which pass through the attenuator and the switch when the latter is in a first position into the coupler to be directed to a selected one of of the terminations whose impedance match with the receiver is to be measured;
recording as a reference level the level of the level indicator, representing the power of signals reflected by the selected termination to the receiver;
recording the setting of the attenuator when signals from the source pass therethrough and the switch in the first position to the selected termination;
switching the switch to a second of its two positions;
injecting signals from the source which pass through the attenuator and the switch when the latter is in said second position into the coupler to be directed directly to the receiver; and
adjusting the attenuator to a new setting in which the level on the level indicator corresponds to said reference level.

8. The method as recited in claim 7 wherein the waveguide switch is switchable to a reference termination of preselected impedance, the method further including the steps of providing tunable means coupled to the directional coupler and tuning the tunable means when signals are directed from the source to the reference termination through the attenuator and directional coupler to minimize the level indicated on the level indicator.

References Cited

UNITED STATES PATENTS

| | | | |
|---|---|---|---|
| 2,549,385 | 4/1951 | Rapuano | 325—363 X |
| 2,562,281 | 7/1951 | Mumford | 324—95 |
| 2,615,958 | 10/1952 | Phillips | 324—95 |
| 2,630,475 | 3/1953 | Woodward | 324—95 X |
| 3,090,955 | 5/1963 | Hubka et al. | 343—17.7 |
| 3,212,000 | 10/1965 | Allerton et al. | 324—58 |
| 3,167,714 | 1/1965 | Seling | 250—83.3 |

ROBERT L. GRIFFIN, Primary Examiner

B. V. SAFOUREK, Assistant Examiner

U.S. Cl. X.R.

324—58, 95